July 23, 1940. E. P. GAINES 2,209,263
AIR CONDITIONING DEVICE
Filed Oct. 14, 1936 4 Sheets-Sheet 1

INVENTOR.
EDMUND P. GAINES
BY Jerome R Cox
ATTORNEY.

July 23, 1940.  E. P. GAINES  2,209,263
AIR CONDITIONING DEVICE
Filed Oct. 14, 1936  4 Sheets-Sheet 2

INVENTOR.
EDMUND P. GAINES
BY Jerome R Cox
ATTORNEY.

July 23, 1940.  E. P. GAINES  2,209,263
AIR CONDITIONING DEVICE
Filed Oct. 14, 1936  4 Sheets—Sheet 3

INVENTOR.
EDMUND P. GAINES
BY Jerome R Cox
ATTORNEY.

July 23, 1940.  E. P. GAINES  2,209,263
AIR CONDITIONING DEVICE
Filed Oct. 14, 1936  4 Sheets-Sheet 4

INVENTOR.
EDMUND P. GAINES
BY Jerome R. Cox
ATTORNEY.

Patented July 23, 1940

2,209,263

UNITED STATES PATENT OFFICE 2,209,263

AIR CONDITIONING DEVICE

Edmund P. Gaines, Columbia, S. C.

Application October 14, 1936, Serial No. 105,540

16 Claims. (Cl. 257—3)

This application is in part a continuation of my copending application Serial Number 534,601 filed May 2, 1931.

This invention relates to automatic means for controlling the ventilation, pressure, temperature, moisture, and oxygen content of the air in buildings and enclosed spaces.

The main constituents of air are nitrogen and oxygen in mechanical mixture. The approximate proportions are 79% nitrogen and 21% oxygen. For some purposes, oxygen is the most important. For instance, oxygen is necessary for supporting animal life and for supporting ordinary combustion. Nitrogen is inert and does not combine mechanically with other elements when breathed or when under combustion. Oxygen is, of course, necessary to support human life. It is necessary, therefore, that in rooms occupied by human beings, there always be an ample supply of oxygen. Because of heating and cooling conditions it is often uneconomical to pass a continuous draught of fresh air through the rooms. Consequently, a large part of the oxygen is soon consumed and as the proportion of oxygen in the air is reduced the room becomes unhealthy to live in. The reason for this unhealthful condition of the air is due largely to the increase of the carbon dioxide content and to the decrease of the oxygen content. Statistics show the following approximate percentages between inspired pure air and the mixture which is expired:

|  | N | O | $CO_2$ | Total |
|---|---|---|---|---|
| Inspired | 79 | 20.96 | 0.04 | 100 |
| Expired | 79 | 16.62 | 4.38 | 100 |

From these figures, it is readily seen that in air which has been inspired and expired only once the oxygen decreases approximately 21% and the carbon dioxide increases by about 10,850%. Since air containing over 4% carbon dioxide becomes dangerous to breathe, it is manifest that in living quarters it must be changed often. The rate of change necessary depends upon the number of people or animals within the enclosure, their lung capacities, and the kind of work they are doing.

For average ventilation of a room 8x12x12 feet occupied by one adult a complete change of air is required about every four hours. However, if two persons are in the room, the air should be changed completely every two hours and if the room is occupied by four persons the change should be made at hourly intervals. Heretofore, ventilation has been accomplished manually with little regard to the actual requirements of the occupants of the room. This method is annoying and in enclosures artificially cooled or heated, is expensive.

In some cases it may be desirable that the oxygen content of the air within an enclosure be greater than normal. A means for effecting this result automatically is disclosed herein.

It further appears that living and working quarters would be more healthful and comfortable if the barometric pressure of the atmosphere were held constant. A means whereby this result may be achieved automatically is likewise disclosed herein.

From the foregoing it appears highly desirable to control automatically the oxygen content in the air used for breathing in fully enclosed spaces. Furthermore it may be desirable at times to supply automatically, additional oxygen to these enclosures and to regulate automatically, the barometric pressure thereof. It is proposed by the devices disclosed herein to regulate automatically, the ventilation of enclosed spaces, to provide automatic means for supplying the desired percentage of additional oxygen and to provide for regulating the barometric pressures within said enclosures. It should be understood however, that the devices for supplying additional oxygen and for controlling the barometric pressure within the enclosures may be made inoperative without in any way affecting the device for regulating the ventilation.

As heretofore stated, oxygen is necessary for supporting animal life. It is also necessary for supporting combustion. This latter fact is utilized for controlling automatically the ventilation of enclosures, in accordance with the requirements of the occupants thereof. Carbon dioxide is about one and one half times heavier than air and consequently settles, and it does not support combustion. The larger the proportion of oxygen and the lower the proportion of carbon dioxide, the brighter and hotter a flame will be. A flame thus may be utilized to determine and control the amount of oxygen present.

Objects of this invention are therefore to regulate automatically the amount of fresh air admitted to a complete enclosure and to regulate automatically the amount of stale air and gas exhausted therefrom.

A further object is to supply automatically any desired percentage of additional oxygen to the fresh air admitted to the enclosure.

A further object of the invention is to provide a device operating to supply air rich in oxygen to the interior of a building; to provide means to regulate automatically the amount of air, especially air rich in oxygen admitted to the building; and to control automatically the amount of used air and gas ejected from the building.

A further object is to control automatically the barometric pressure within said enclosure.

A further object is to provide controls in combination for maintaining the air in an enclosure at the desired temperature, pressure and humidity and for maintaining sufficient oxygen content therein.

Further objects will be apparent from a reading of the subjoined specification and claims and from a consideration of the accompanying drawings.

In order to explain the invention more clearly, several embodiments thereof are shown in said drawings, in which.

In general, the embodiments illustrated each disclose an enclosure and within the enclosure (a) a flame which burns brightly when the content of the air within said enclosure is relatively high in oxygen and low in carbon dioxide and which burns dimly when the air is low in oxygen content or high in carbon dioxide; (b) a thermostat which is in some instances a bimetallic bar, located above so as to be heated by the flame, the bar making certain electrical contacts at different temperatures as determined by the heat of the flame; (c) a blower for forcing fresh air into the enclosure; (d) means for exhausting stale air and undesirable gases from the enclosure, both the blower and the exhausting means being actuated by electric motors controlled by electrical contacts made by the thermostat; (e) in some instances an aneroid barometer; and (f) in some instances a governor for opening an oxygen valve.

Figure 1:
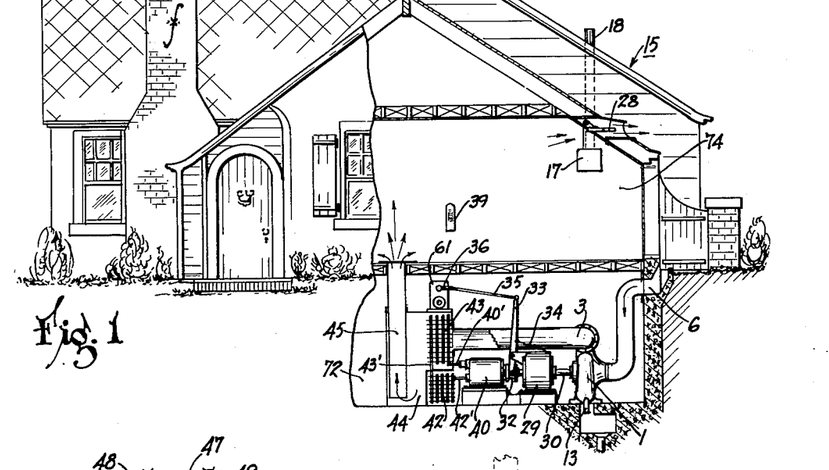
Figure 1 is a view in elevation of a house having a part of one wall broken away to show a part of the interior of the building which is equipped with my novel automatic ventilating system.

Referring particularly to the drawings, in Figure 1, I have shown a building equipped with one form of novel device for automatically controlling the ventilation thereof. The building as a whole is designated by the numeral 15 and has a basement or air conditioning room 72. The building also has an automatically ventilated living compartment designated 74. Positioned in the basement 72 is an electric motor 29 which drives my improved blower or blower-separator 1. The blower-separator 1 has an intake opening 6 extending without the building so as to draw in fresh air. A conduit 3 leads air from blower 1 through a cooling compartment 44.

An outlet 13 for dust, moisture, etc., extends downward outside of the building. The air from the cooling compartment 44 passes upward through a stack 45 into the living compartments 74 of the building 15, and thus clean cooled air rich in oxygen is supplied to the building. The air after being used within the building may pass out through an opening controlled by a counter-balanced exhaust door 28 (in the upper right hand corner of Figure 1).

I provide means for automatically controlling the amount of air rich in oxygen which is supplied to the room and the amount of used air which is exhausted therefrom. I position a burner 16 (Figure 2) having a flame 19 near the top of the building within a box 17 (Figures 1 and 2) and provide adjacent thereto and above said burner a chimney 18 to carry off all the fumes from the burner. I have shown a gas burner, but any type of flame depending upon oxygen for combustion may be used. It is clear that the brilliance and heat of the flame will depend upon the amount of oxygen supplied thereto. When the building is filled with air rich in oxygen, the flame will be relatively high and when the building is filled with air poor in oxygen or with air composed largely of carbon dioxide, the flame will be relatively low. Mounted above the burner 16 is a composite bimetallic bar 20—21 firmly secured at one end but free at the other. The bar is composed of a strip 20 which is of metal of high specific expansion and a strip 21 which is of a metal of low specific expansion. Beneath the free end of the bar 20—21 is an electrical contact point 22 on which the bar 20—21 at times rests and to which is attached an electric wire 23 leading to the motor 29. Electrical current is supplied from any suitable source from which an electric wire 24 leads to the secured end of the bimetallic bar 20—21. Another wire 24$^b$ leads from the source to the electric motor 29. The electric motor 29 drives the air blower-separator 1 by means of a shaft 30. Attached to the free end of the bimetallic bar 20—21 is a cord 26 which passes upward over a pulley 27 and at its opposite end is connected to the door or gate 28. The door 28 is counterbalanced so that it is easily turned but so that upon release it will close itself. It may thus be seen that when the gas burner (on account of a large supply of oxygen thereto) is burning brightly, the heat therefrom will cause the bimetallic bar 20—21 to curve upward and break the electrical circuit by the movement of the end of the bar away from the contact point 22. This will shut off the electric motor 29 and therefore will stop the blower-separator 1 and the supply of resh air rich in oxygen to the room. At the same time it will release the cord 26 and close the door 28 to prevent the egress of air from the room. However, as soon as the air in the room becomes lean or poor in oxygen the flame of the gas burner will decrease in size, the heat will decrease and the bimetallic bar will return to its straight form in which the end thereof will contact with the contact point 22 and complete the circuit. The completion of the circuit will energize the motor 29 and cause fresh air rich in oxygen to be drawn in by the blower 1 and supplied through the cooling compartment 44 to the building.

As suggested above, at times, it may be desirable when air is being supplied to the room that the air should be cooled. However, at other times such cooling will be undesirable. I provide means by which a cooling device is driven by the same motor 29 which drives the air blower, but I also provide means by which this cooling device may (if desirable) be rendered inoperative even while the air blower is being operated. The shaft 30 is continued through the opposite (left hand as shown) side of the electric motor 29 and is at times connected by means of a clutch 32 with a compressor unit 40 of a compressor-evaporator system of cooling. As stated, the compressor is shown at 40 and is connected by a conduit 42' with a condenser 42. The exhaust pipe 43' of the condenser is connected with an evaporator 43 and the exhaust from the evaporator 43 is conducted by a conduit 40' with the compressor 40. The air coming in through the conduit 3 is cooled by the coils of the evaporator 43 located in the cooling compartment 44.

I provide a thermostatically controlled device for making the clutch 32 operative or inoperative depending upon the temperature of the air in the building. A thermostat 39 formed of a curved bimetallic strip 39ª is provided with a contact leaf 47 adapted at times to touch an adjustable contact screw 48 and at other times to touch an adjustable contact screw 49. These contacts thus depend on the temperature of the room and the resultant curvature of the bimetallic thermostatic strip 39ª. The fixed end of the curved thermostatic strip is connected by an electric wire 38 with an auxiliary electric motor 37 (Figure 3) and another electric wire 38ª leads from the auxiliary motor 37 (Figure 3) to the source from which electricity is thus at times supplied to said auxiliary motor. Another wire 38ᵇ leads from said source to a switch 63. The switch is provided with two resiliently controlled leaves 63ª and 63ᵇ. The leaf 63ª is at times adapted to touch an electric contact 65 and the leaf 63ᵇ is at times adapted to touch an electric contact 66. The contact 65 is connected by an electric wire 38ᶜ with the contact screw 48 and the contact 66 is connected by an electric wire 38ᵈ with the contact screw 49. The shaft of the auxiliary electric motor 37 is adapted to drive a lever 36 through gears in gear box 61. The lever 36 by means of a flexible connection 35 is adapted to move the lever 33 against the spring 34 to cause the clutch 32 to be disengaged or to allow the spring 34 to move the lever 33 to engage the clutch 32. As shown in Figure 1, the clutch is held engaged by the spring 34. The auxiliary motor 37 also through gear box 61 drives a cam 62 (Figure 3) which is adapted alternately to break the electrical circuits which include the wires 38ᶜ and 38ᵈ, respectively. Thus, whenever the leaf 47 moves into a contact with either of the contact screws 48 or 49 an electric circuit is formed through the motor 37 so that the motor operates until the lever 36 is moved through 180°. Thereupon, the cam 62 (which has simultaneously been moved 180°) breaks the circuit. The circuits remain broken and the auxiliary motor remains inoperative until the leaf 47 is moved to the other screw whereupon the operation is repeated.

Figures 2, 3, 4:
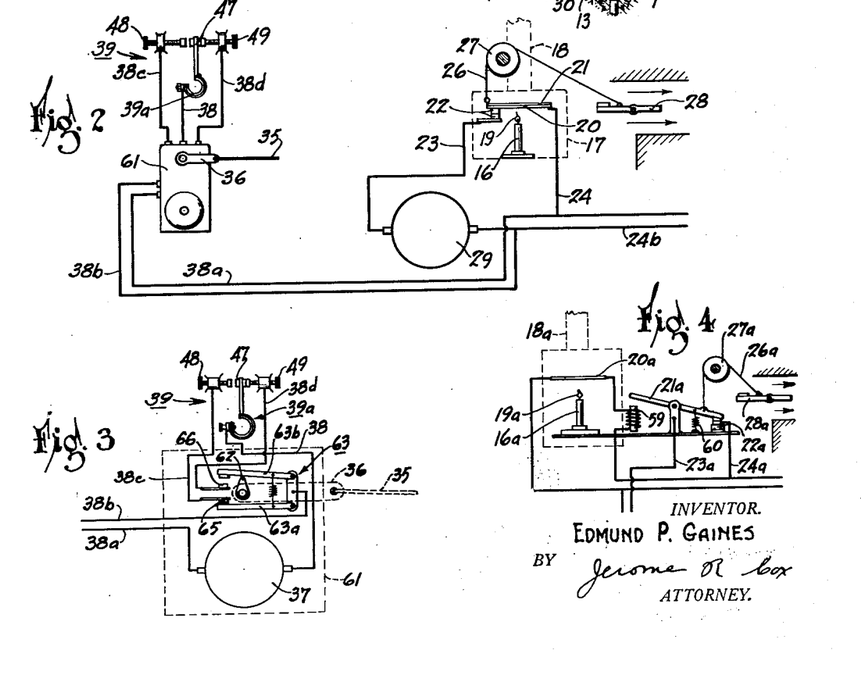
Figure 2 is a diagrammatic view showing the controls of Figure 1 and showing especially the electric circuits thereof.
Figure 3 is a diagrammatic view showing a detail of one unit of Figures 1 and 2.
Figure 4 is a diagrammatic view showing a modified form of control which may be used instead of a portion of Figures 1 and 2.

In Figure 4 I have shown an alternative method of automatically controlling the operation of the air blower 1 so that the building is always supplied with an adequate supply of air rich in oxygen. Therein, the electric current flows through the electric wire 24ª to a contact element 22ª, thence through a switch bar 21ª and an electric wire 23ª to energize the motor in a manner similar to the manner disclosed in Figure 2. The switch bar 21ª is normally held in contact with the contact element 22ª by a spring 60 but is at times adapted to be moved away therefrom by means of an electric magnet 59 receiving current through a circuit which passes through a resistance bar 20ª. This resistance bar is of a material such that when cold, the resistance to the passage of electrical current is so great that the electric magnet 59 will not be energized but which, when heated by a flame 19ª of a burner 16ª, will allow the passage of sufficient current to energize the magnet 59 and attract the end of the switch bar 21ª. The bar 21ª may be of an alloy of copper, manganese, and nickel or an alloy of copper and nickel, but is preferably of carbon. The flame 19ª of the burner 16ª is brilliant or low, depending upon the amount of oxygen supplied thereto. The exhaust fumes from the burner may pass out through the chimney 18ª which extends outside of the building. The switch bar 21ª also has connected thereto a cord 26ª which passes upward over a pulley 27ª and thence to an exhaust door 28ª by which the air may be exhausted from the building. It may thus be seen that the supply of oxygen in the building governs the size and intensity of the flame 19ª and thus controls the amount of electricity flowing through the resistance 20ª. When the air supplied is rich in oxygen content, the flame will be higher, the resistance will be lower and the electricity in the circuit will be stronger, causing the magnet 59 to be energized and the switch bar 21ª rotated against the pull of the spring 60 to break the circuit formed by wires 23ª and 24ª and stop the operation of the motor 29 and stop the supply of fresh air. The movement of the switch bar 21ª also operates the gate 28ª to close the opening adjacent thereto and prevent the exhaust of air from the building.

The operation of the blower-separator I itself is as follows: The rotor blower 1 is rotated by the shaft 30 at a high rate of speed. Air is drawn in through the intake 6 and is thrown radially outward by the rotor blades. The centrifugal force of the rapidly rotating air throws the heavier foreign matter to the outer walls where it is caught by the trap formed by the outlet 13.

When my blower-separator is used in a building, it may, as shown operate in combination with automatic controls for maintaining a substantially constant content of oxygen in the building and for maintaining a desired temperature in said building. When so used, the air enters through the inlet 6 and the moisture, dust, etc., is separated therefrom and discharged through the outlet tube 13. Air rich in oxygen is supplied through the tube 3 to the cooling compartment 44. Dependent upon whether the temperature in the building is above or below that desired, the air will be cooled or allowed to pass into the building at the initial temperature.

So long as the content of oxygen in the room is at or below that desired, the flame 19 will remain small and of low heat intensity and the bimetallic bar 20—21 will remain straight, completing the circuit for the main motor 29 and causing the motor to operate the blower-separator continuously to draw fresh air into the opening 6, to scavenge it of dirt and moisture, to deliver it through the cooler 44 where it is cooled if necessary and then to deliver it to the main part of the building. As soon, however, as the oxygen content becomes above that desired, the flame 19 increases in size and intensity and the bimetallic bar 20—21 curves, thus breaking the circuit and stopping the motor 29. At the same time the curving of the thermostat element 20—21 releases the cord 26 and allows the door 28 to close the exhaust opening. The fumes from the burner continuously escape through the chimney 18. When the oxygen content in the room drops too low, the flame becomes smaller, the bar 20—21 straightens and touches the contact 22 and the electric circuit is again formed. This causes the operation again of the motor 29 to deliver fresh air and causes the opening of the exhaust door 28.

In the alternative form shown in Figure 4 the excess of oxygen causes the flame 19ᵃ to increase in size and intensity and thus to heat the resistance 20ᵃ to allow the passage of sufficient current through the circuit to energize the magnet 59 and retract the switch bar 21ᵃ to break the main circuit and cause the motor 29 to stop. At the same time this movement of the switch bar 21ᵃ releases the cable 26ᵃ and allows the door 28ᵃ to close to prevent the escape of air from the building.

Responsive to the temperature in the building, the leaf 47 will normally be in contact with one or the other of the contact screws 48 or 49 and will control the clutch 32. If the temperature in the room is above normal the clutch will be engaged so that the cooling apparatus will be operating whenever the blower is operating. If the temperature in the room is too low or is at the proper temperature the clutch 32 will be disengaged and the air entering into the cooling compartment 44 will pass without substantial change in temperature upward through the tube 45 into the main portion of the building. As shown in Figures 2 and 3 the temperature of the building is above the desired temperature and the thermostat 39 holds the leaf 47 in contact with the screw 49. By reason of the electrical circuit, this has caused the auxiliary motor 37 to move the clutch to a position in which it is engaged and the air which goes into the cooling compartment 44 is cooled by the compressor-evaporator apparatus 40—42—43. After being cooled, the air passes up through the stack 45 into the main portion of the building as before described. When the temperature drops to the desired temperature the thermostat 39 will cause the leaf 47 to move slowly across into contact with the screw 48. As shown most clearly in Figure 3 this will complete a circuit from the source of electrical current supply through the electric wire 38ᵇ, the switch 63, the contact 65, the electric wire 38ᶜ, the contact screw 48, the leaf 47, the thermostat element 39ᵃ, the electric wire 38, the auxiliary motor 37 and the electric wire 38ᵃ. This will cause the auxiliary motor 37 to revolve and in revolving it will move the lever 36 to draw the connection 35 and thus turn the lever 33 on its axis and disengage the clutch 32. The motor at the same time turns the cam 62. When the motor has turned the lever 36 through 180° so that the clutch becomes wholly disengaged the cam will also be turned through 180° and pressing against the leaf 63ᵃ will disconnect the leaf from the electric contact 65 and thus break the circuit and stop the motor. The motor will remain at rest until the leaf 47 is moved, by reason of a rise in temperature to contact again with the screw 49 when a similar sequence of events will cause a circuit to be formed through the wire 38ᵇ, the leaf 63ᵇ, the contact 66, the wire 38ᵈ, the contact screw 49, the leaf 47, the thermostat 39ᵃ, the wire 38, the auxiliary motor 37, and the wire 38ᵃ. This circuit will energize the auxiliary motor to turn the lever 36 and the cam 62 through another 180° to allow the spring 34 to engage the clutch 32 and at the same time again break the circuit. Thereupon the auxiliary motor 37 will remain at rest until the leaf 47 moves again and if the motor 29 is operative, its operation will cause the blower 1 to function and at the same time cause the cooling apparatus to be operative until the temperature drops to that desired. However, regardless of the temperature of the room, until the motor 29 and blower 1 are made active, the cooler 44 is inoperative.

Figures 5, 6, 11, 12:
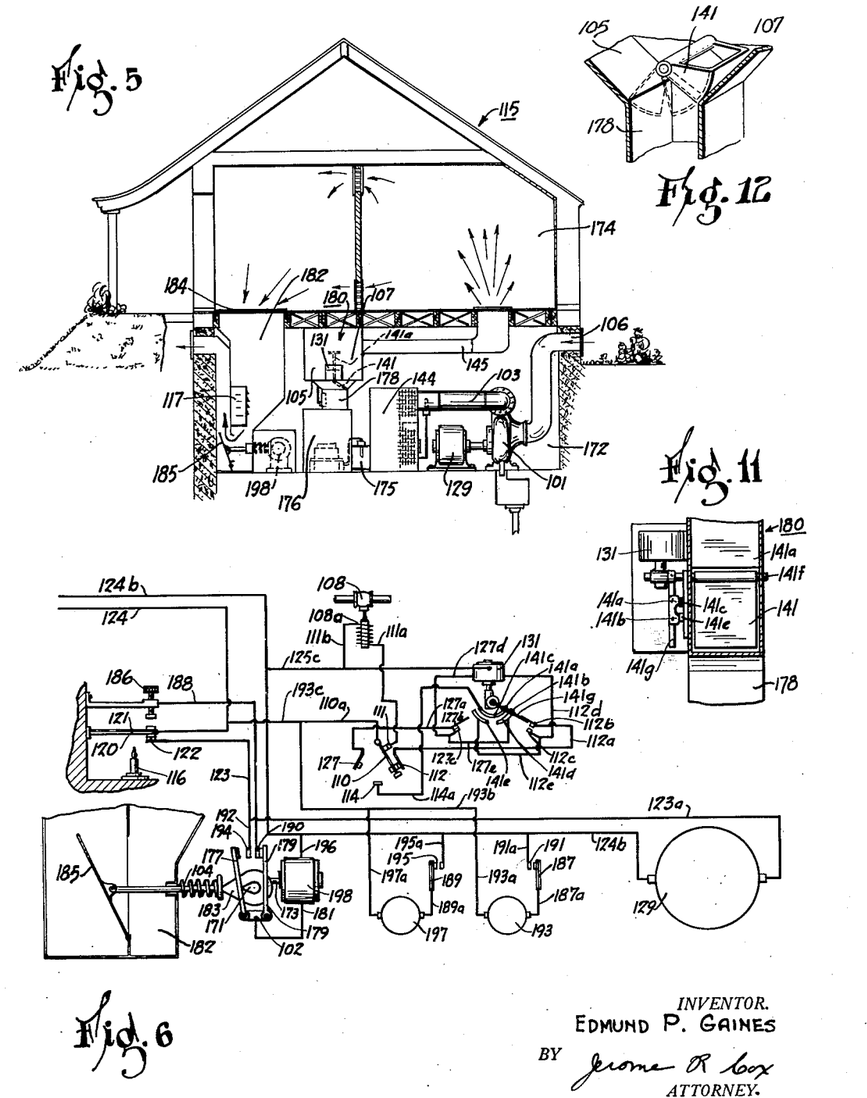
Figure 5 is a view similar to Figure 1 showing an alternate arrangement.
Figure 6 is a diagrammatic view showing the controls and electric circuits of Figure 5.
Figures 11 and 12 are fragmentary views of a detail of Figures 5 and 6.

In Figures 5 and 6 I have shown a somewhat similar arrangement in which there is provided in addition, means for heating the air when necessary and also means for controlling the amount of moisture present. The building 115 has an air conditioning room 172 and an automatically ventilated living compartment 174. The air conditioning room 172 has an electric motor 129 driving a blower-separator 101 having an intake opening 106 and a conduit 103 for conducting air from blower 101 through a cooling compartment 144. The air passes thence through conduit 175 to a heating device 176, thence upward through conduit 178 to drying and humidifying device 180, and thence through conduit 145 to the living compartment 174, thus supplying fresh air to the building. The air after being used within the building may pass out by way of well 182 and through an opening controlled by exhaust valve 185.

I provide means for automatically controlling the amount of fresh air which is supplied to the enclosure and the amount of used air which is exhausted therefrom. I position an oxygen control means 117 near the bottom of the well 182, the oxygen control means 117 including a burner 116 (Figure 6). I have shown a gas burner but any type of flame depending upon oxygen may be used or guarded flame combustion such as discovered by Davy may be employed. It is clear that the brilliance and heat of the flame, as depicted, will depend upon the amount of oxygen supplied thereto. When the well 182 is filled with fresh air the flame will be relatively high and when the well is filled with air poor in oxygen or with air composed largely of carbon dioxide, the flame will be relatively low. It is also apparent that since carbon dioxide is about one and one half times heavier than air, that it will gravitate to the bottom of the well and will thus accentuate the action of the flame. Mounted above the burner 16 is a composite bimetallic bar 120—121 firmly secured at one end but free at the other. The bar is composed of a strip 120 which is of metal of high specific expansion and a strip 121 which is of metal of low specific expansion. Beneath the free end of the bar 120—121 is an electrical contact point 122 which the bar 120—121 at times rests and to which is attached an electric wire 123—123ᵃ leading to the electric motor 129. Electric current is supplied from any suitable source from which an electric wire 124 leads to the bimetallic bar 120—121. Another wire 124ᵇ leads from the source of current to the electric motor 129. The electric motor 129 drives the blower 101 through a plurality of speed multiplication gears, not shown. When bimetallic bar 120—121 is resting on contact 122, the circuit is complete and electric motor 129 drives blower 101 forcing fresh air into the enclosure. Situated above bimetallic bar 120—121 is electrical contact screw 186 with which bar 120—121 makes contact when heated by the flame. Connected with screw 186 is electric wire 188 which leads to electric contact 190. From contact 122 the electric wire 123 leads through another wire 192 to another electric contact 194. Electric wire 196 connects the wire 124b to an electric motor 198, which is connected by a wire 181 with a switch 102. A small cam 171 driven by a shaft 173 driven in turn by reduction gears of motor 198 alternately bears on breaker arms 177 and 179 which form a part of switch 102 of which therefore are connected by the electric wire 181 to the motor 198. A large cam 183 also driven by shaft 173 opens exhaust valve 185. When cam 183 is rotated 180° from the position illustrated, valve 185 is closed by compression spring 104. When the oxygen content of the air in well 182 is low or the carbon dioxide content therein is high (note that the carbon dioxide will settle into well 182 through grate 184) flame 116 burns feebly and bimetallic bar 120—121 is cool and straight making contact with contact 122. In this condition, the electric circuit to motor 129 is complete, the motor runs, and a blower 101 forces fresh air into the enclosure through conduit 103, cooler 144, conduit 175, heater 176, conduit 178, cleaner and humidifier 180, and conduit 145. At this time the electric circuit formed by wire 124, bar 120—121, conduit 122, wires 123—192, contact 194, breaker arm 177, and wire 181 is broken at contact 194. Therefore motor 198 is stopped in the position shown, valve 185 remains open, and the used air and undesirable gases are forced out from the enclosure. As soon as the inrush of fresh air has caused the flame of the burner 116 to grow bright and hot, bimetallic bar 120—121 assumes an upwardly curved position and breaks the contact with post 122. This shuts off motor 129. In the upwardly curved position, bimetallic bar 120—121 contacts screw 186. An electric circuit formed by wire 124, bar 120—121, contact 186, wire 188, contact 190, breaker arm 179, wire 181, motor 198, and wires 196 and 124b is now complete and motor 198 will run until cam 171 rotates 180° and opens the contact between breaker arm 179 and contact 190, whereupon motor 198 stops. At the same time cam 183 has likewise rotated 180° allowing valve 185 to close. This completes the cycle whereby fresh air is substituted for the stale used air and objectionable gases within the enclosure. The cooler 144 and the heater 176 are controlled by thermostats 187 and 189 respectively. Whenever the temperature is too high the thermostat 187 closes the switch 191 and thus completes a circuit through wire 124b, wire 191a, switch 191, thermostat 187, wire 187a, motor 193, wire 193a, wire 193b, wire 193c and wire 124, thus energizing the motor 193 to drive the compressor evaporator unit. Whenever the temperature is too low, the thermostat 189 closes the switch 195 and completes an electric circuit through the wire 124b, wire 195a, wire 197a, contact 195a, thermostat 189, wire 189a, motor 197, wire 197a, wire 193b, wire 193c and wire 124, thus energizing the motor 197 to drive the blower of the oil burner of the heater unit 176.

The unit 180 for controlling the moisture content includes two separate compartments 105 and 107 separated by a partition 141a. In the compartment 105, there is positioned the spray valve 108 and in the compartment 107 is positioned the drier. The unit is controlled by a movable switch element 110 responsive to moisture content of the air. When the air is too dry the element 110 swings to the position shown to touch the contacts 111 and 112. When the moisture content is correct the element 110 swings to touch the contact 114 and when the moisture content is too high the element 110 swings to touch a contact 127. The element 110 is connected by a wire 110a with the wire 124 and thus with the source of electric current. A gate element 141 is pivoted on a shaft 141f which has a lever 141g. The lever 141g moves in unison with gate 141 and carries connected contacts 141a and 141b of which the first is arranged to touch a contact 141c and the second with either contact 141d or 141e. When the gate 141 is in position to cause the air to pass through spray compartment 105 (as shown), if the moisture content is correct, an electric circuit may be formed as follows: wire 124, wire 193c, wire 110a, moisture control switch 110, contact 114, wire 114a, contact 141c, contact 141a, contact 141b, contact 141d, wire 127e, wire 127d, motor 131, wire 125c and wire 124b. This causes the motor 131 to rotate the gate 141 clockwise to a neutral position. When the gate reaches the neutral position the contact element 141b will move away from contact 141d and break the circuit. The entrance to the drying compartment 107 is so formed that with the gate in the neutral position, the air still cannot enter the drying compartment and is compelled to pass through the moisture compartment, but there will be no excess moisture absorbed by the air, because the spray will then be inactive. Similarly when the gate 141 is in position to cause the air to pass through the drying compartment 107, if the moisture content is correct, an electric circuit may be formed as follows: wire 124, wire 193c, wire 110a, moisture control switch 110, contact 114, wire 114a, contact 141c, contact 141a, contact 141b, contact 141e, wire 112e, wire 112d, motor 131, wire 125c, and wire 124b. This causes the motor 31 to rotate the gate 141 counterclockwise to a neutral position. When the gate reaches the neutral position the contact element 141b will move away from contact 141e and break the circuit. Thus the gate 141 will always be moved back to neutral position after the moisture content has been corrected.

If with the gate 141 in neutral position, the air becomes too dry, the moisture control switch element 110 is caused to move counterclockwise to the position shown. This forms an electric circuit as follows: wire 124, wire 193c, wire 110a, switch 110, contact 111, wire 111a, solenoid 108a, wire 111b, wire 125c and wire 124b. The solenoid 108a opens the water spray valve and thus increases the moisture content of the air being supplied to the living compartment. A second electric circuit is also formed as follows: wire 124, wire 193c, wire 110a, switch 110, contact 112, wire 112a, contact 112b, contact 112c, wire 112d, motor 131, wire 125c and wire 124b. This causes the motor 131 to rotate the gate 141 counterclockwise to the position shown whereupon the contact between 112b and 112c will be broken and the motor will stop. Thus air coming through the conduit 178 will be directed to the left through the spray compartment and additional moisture will be supplied to it.

If with the gate 141 in neutral position, the air becomes too moist, the moisture control switch element is thereby caused to move clockwise to form a contact 127. An electric circuit is thus formed as follows: wire 124, wire 193c, wire 110a, switch 110, contact 127, wire 127ª, contact 127ᵇ, contact 127ᶜ, wire 127ᵈ, motor 131, wire 125ᶜ and wire 124ᵇ. This causes the motor 131 to rotate the gate 141 clockwise until the contact between 127ᵇ and 127ᶜ will be broken and the motor will stop. Thereupon air coming through the conduit 178 will be diverted to the right through the drying compartment 107 and excess moisture will be removed therefrom. Drying compartment 107 contains a chemical such as calcium chloride (table salt), calcium oxide (unslaked lime) sodium sulphate, calcium sulphate, sulphuric acid, or glycerine which will absorb moisture from the air. Obviously, it will be necessary to replace this chemical at intervals.

Figure 7:
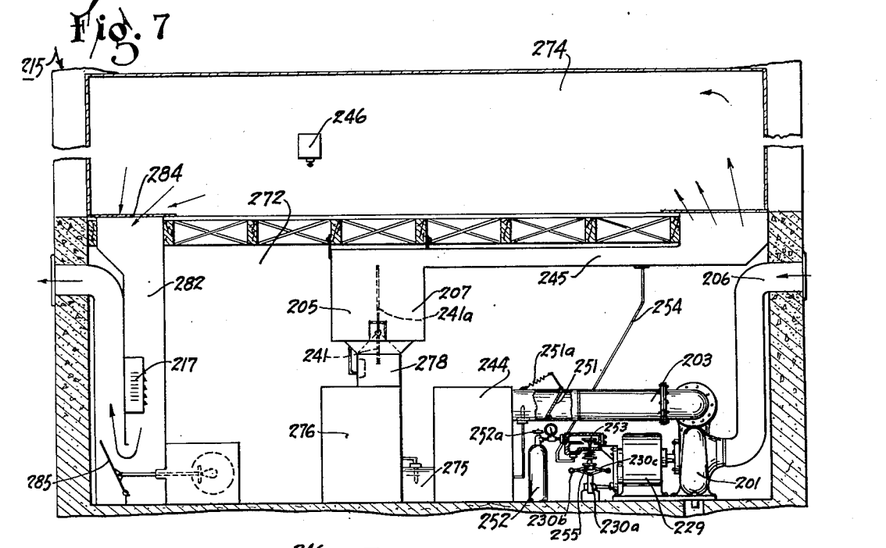
Figure 7 is a sectional view of a portion of a house illustrating a further modified arrangement.
Figure 8:
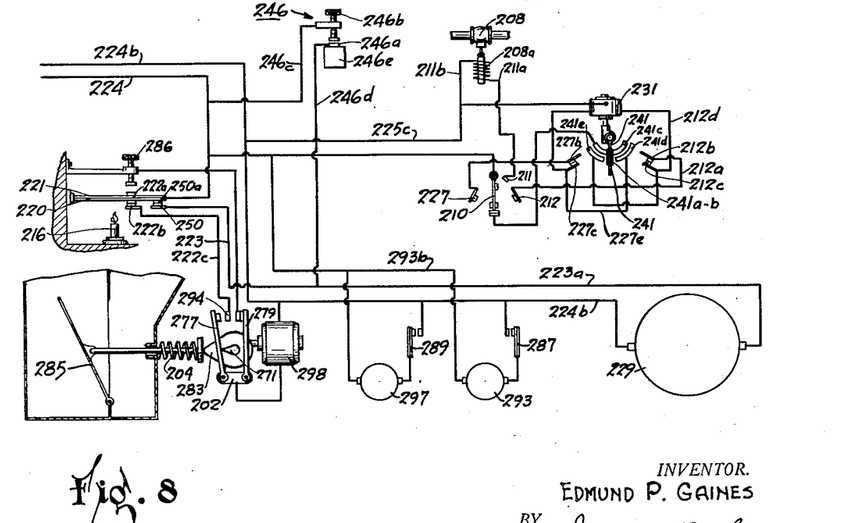
Figure 8 is a diagrammatic view showing the controls and electric circuits of Figure 7.

Not only is it desirable that the air of inhabited enclosures be controlled so as to maintain proper oxygen content, moisture content and temperature, but also it is desirable to control the density or pressure. To this end, the arrangements of Figures 7 to 10 inclusive are shown. In Figures 7 and 8 I have indicated parts which are similar to the parts of Figures 5 and 6 by the same numerals with the addition of 100. There is also provided a barometer 246 comprising a sealed container 246ᵉ arranged to expand when the pressure in the room drops too low and thus operating to move a contact element 246ª to touch an adjustable contact screw 246ᵇ. The screw 246ᵇ is connected by a wire 246ᶜ with wire 224 and the contact 246ª is connected by a wire 246ᵈ with wires 223ª and 223. The wire 223 is connected to a contact 250; which a contact element 250ª on the end of the thermostat element 220—221 at times touches. The element 220—221 also has a contact 222ª which the element 222ᵇ is arranged to touch and the latter is connected by a wire 222ᶜ with the contact 294. Thus when the thermostat element is in the position shown by reason of the flame being low because the oxygen content is too small, the motor 229 will be operated to draw in fresh air and the gate 284 will be opened to let out used air. If, however, the oxygen content is satisfactory the contacts 222ª, 222ᵇ and 250—250ᵇ will be broken and the contact 222ª—286 will be made. This will cause the gate to be closed. If, with the gate closed, the pressure is too low, the contact 246ª—246ᵇ will be closed and the motor 229 will operate the blower 201 to force in additional air to raise the pressure.

The following points are to be observed:

a. Whenever the atmospheric pressure within the enclosure drops from any cause such as seepage through the walls or loss of air through opening and closing of the doors to compartment 274, aneroid barometer 246 will make contact with screw 246ᵇ and the pressure will again be brought up to the density desired.

b. When the air is being changed and valve 284 is open, the atmospheric pressure within compartment 274 will be the same as that outside. However, since in normal living compartments the periods when the air is being changed will be relatively short, the higher desired pressure will be maintained most of the time.

c. When it is not desired to maintain a higher barometric pressure within compartment 274 than without, aneroid 246 can be made inoperative by adjusting screw 246ᵇ to such a position that contact will not be made.

As shown in Figure 7, there is provided a valve 251 in the conduit 253 held closed by a spring 251ª except when the blower 201 is being operated. This valve prevents the escape of air backward through the blower even when the blower is not being operated.

I provide additional means to add oxygen to the air to raise the oxygen content, when desired. As shown in Figure 7, I have provided an oxygen tank 252 arranged to supply pure oxygen past a valve 253 and through a pipe 254 to the conduit 245. The valve 253 is controlled by a governor 255 driven by the motor 229. Thus whenever the motor 229 drives the blower 201 the governor 255 holds open the valve 253 to supply additional oxygen to the air stream. Otherwise the valve 253 prevents the escape of oxygen. When shaft 230ª is rotated at high speed, governor weights 230ᵇ hinged thereto in the usual manner, spread causing links 230ᶜ to assume an approximately horizontal position. When links 230ᶜ assume the horizontal position they force the valve 253 open. When valve 253 opens, oxygen from bottle 252 flows through tube 254 into conduit 251 where it mixes with the fresh air being forced therethrough by blower 201. The amount of oxygen delivered is controlled by adjusting valve 252ª. When motor 229 stops, governor weights 230ᵇ rise allowing valve 253 to be closed by the compression spring. It is readily seen that when motor 229 is running, forcing fresh air into compartment 274, that oxygen will be automatically supplied by the means described and that when motor 229 stops, the flow of oxygen will stop. If additional oxygen is not desired in compartment 274, it can be eliminated by closing valve 252ª or by removing the apparatus described without in any way affecting or impairing the automatic ventilating system.

Figure 9:
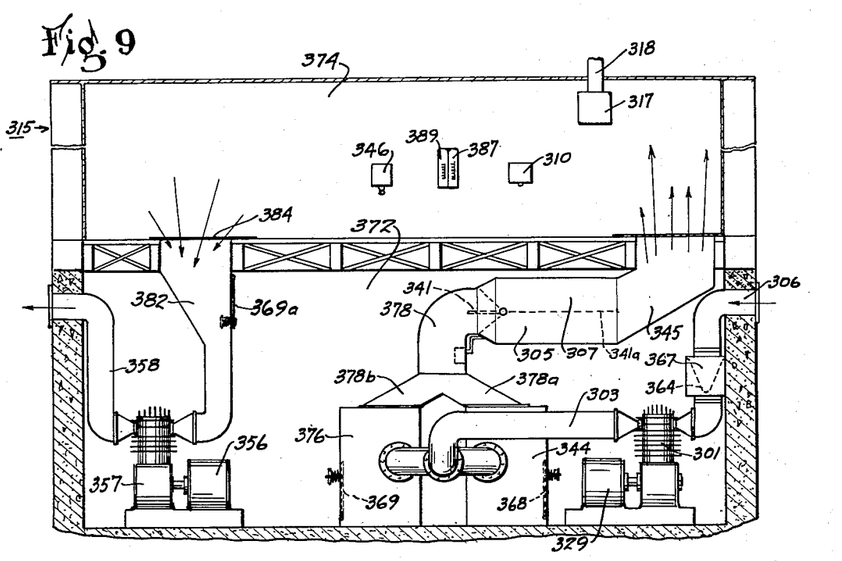
Figure 9 is a sectional view similar to Figure 7 showing a further modified arrangement.
Figure 10:
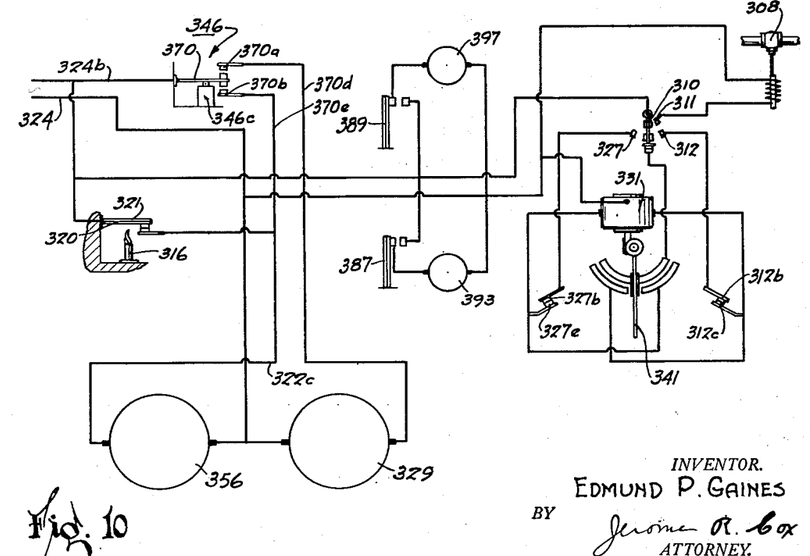
Figure 10 is a diagrammatic view showing the controls and electric circuits of Figure 9.

In Figures 9 and 10 elements similar to elements of Figures 7 and 8 are designated by similar numerals with the addition of 100. However additional devices and controls are provided as follows:

A motor 356 is provided to drive an air pump 357 which serves to exhaust used air through the outlet stack 358. A cone shaped bag 364 porous to air but impervious to dust is provided in a casing 367 and serves to clean the incoming air. Spring held doors 368 and 369 are provided which prevent out flow of air but which allow air to be drawn into the cooler 344 and the heater 376 respectively. Spring held door 369ª likewise allows air to flow into the room 372 from the well 382. The heater and cooler have fans driven by their motors 397 and 393 and these fans serve to direct the fresh air being supplied by the air pump 301 through the heater or through the cooler as desired when fresh air is being drawn in. Moreover when it is necessary to heat or cool the air in the enclosure but unnecessary to draw in fresh air, the appropriate fan serves to circulate the air drawing it in through door 369ª and through one of the doors 368 or 369. Branch conduits 378ª and 378ᵇ from the cooler and heater respectively direct the air into the main conduit which conveys it through the humidifier or dryer. The barometer 346 is provided with a controlled element 370 which when the pressure in the enclosure is too low is moved up to contact the element 370ª thus energizing the motor 329 for the intake pump 301 and which when the pressure is too high is moved down thus energizing the motor 356 for the outlet pump 357. It will be noted that the element 370ª is connected by a wire 370ᵈ with the motor 356. It will also be noted that the motor 356 may be operated to exhaust used air when the oxygen content becomes too low, inasmuch as then the flame of the burner 316 will then be low and the thermostatic element 320—321 will form a circuit through the wire 322c to the motor 356. Pumps 301 and 357 are of the piston type and thus even when inoperative prevent the flow of air in the wrong direction.

Operation

In the operation of my improved conditioning systems, the controls 17, 117, 217 and 317 cause the operation of air pumps 1, 101, 201 and 357 which draw in fresh air or force out stale air and also control outlets 28, 185, and 285. Thus the proper oxygen content is maintained. Thermostats 39, 187, 189, 287, 289, 387 and 389 control the operation of coolers 44, 144, 244 and 344 and of heaters 176, 276 and 376 and thus maintain proper temperatures. Moisture responsive switches 110, 210 and 310 control the spray valves 108, 208 and 308, and the air directing gates 141, 241 and 341 and thus the proper humidity is maintained. Pressure responsive devices 246 and 346 control the operation of the pump 201 and of the pumps 301 and 357 to maintain the desired pressure in the enclosure. Cleaners such as 101, 201, 301 and 364—367 clean the air.

It is to be understood that the above described embodiments of my invention are for the purpose of illustration only and various changes may be made without departing from the spirit and scope of the invention.

I claim:

1. An enclosure having an outlet for the escape of air and gas, means for supplying fresh air into said enclosure, means dependent on the oxygen content of the air within the enclosure for controlling the supply of fresh air thereto and for closing and opening said outlet, said last named means including a flame.

2. In combination, a building, means for supplying air rich in oxygen to said building, means selectively operative for cooling said air rich in oxygen, means dependent upon the temperature of the building for controlling said air cooling means, means for preventing the escape of air from the building, and means dependent upon the oxygen content of the air in the room for controlling the air supplying means and for controlling said means for preventing the escape of air from the room.

3. In combination, an enclosure, a blower for injecting air into said enclosure, a device for changing the temperature of the air, common means for driving said blower and for at times operating said temperature changing device, means responsive to the oxygen content of the air in said enclosure for controlling said common means, and means responsive to the temperature of the air in said enclosure for at times making said temperature changing device inoperative even while said blower is operative.

4. In combination, a building, means for supplying fresh air into said building, an outlet for the escape of air and gas, and means dependent upon the oxygen content of the air within the building for opening and closing the outlet and for controlling the air supplying means.

5. An enclosure having an outlet for the escape of air and gas, means for supplying fresh air into said enclosure, means dependent on the oxygen content of the air and gas for controlling the supply of fresh air thereto.

6. The method of maintaining a desired uniform oxygen content in the air in an enclosure which comprises exhausting air therefrom and simultaneously supplying air having an oxygen content greater than the uniform oxygen content desired to be maintained, and regulating the supply of air rich in oxygen in accordance with the extent to which the oxygen content in the air in the enclosure is below the desired uniform content.

7. In combination, an enclosure, means for controlling the supply of fresh air into said enclosure, means for controlling the escape of air and gas, and means dependent upon the oxygen content of the air within the enclosure for actuating at least one of said controlling means.

8. In combination, an enclosure, means for controlling the supply of fresh air into said enclosure, means for controlling the escape of air and gas, and means dependent upon the constituents of the air within the enclosure for actuating at least one of said controlling means.

9. An enclosure having means for controlling the escape of air and gas, means for controlling the supply of fresh air into said enclosure, and means comprising a flame dependent on the constituents of the air within the enclosure for actuating at least one of said controlling means.

10. In combination, an enclosure, means for supplying fresh air into said enclosure, means for changing the temperature of said supplied air, means for cleaning and humidifying said supplied air, and means dependent upon the constituents of the air within the enclosure for controlling the air supplying means.

11. In combination, an enclosure, means for supplying fresh air into said enclosure, and means dependent upon the oxygen content of the air within said enclosure for supplying additional oxygen thereto.

12. In combination, an enclosure, means for controlling the escape of air and gas, means dependent upon the constituents of the air within the enclosure for actuating said controlling means and means for automatically controlling the pressure of air within said enclosure.

13. In combination, an enclosure, an outlet for the escape of air and gas, and means dependent upon the constituents of the air within said enclosure for controlling said outlet.

14. In combination, an enclosure, means for controlling the supply of fresh air thereto, means dependent on the constituents of the air in said enclosure for actuating said controlling means, and means for automatically controlling the pressure of the air within said enclosure.

15. An enclosure having an outlet for the escape of air and gas, means for supplying fresh air into said enclosure, means within the enclosure dependent on the oxygen content of the air and gas for controlling the supply of fresh air thereto and means for controlling the temperature of said enclosure.

16. In combination, a building, means for supplying air rich in oxygen to said building, an escape for the air and gas within said building, and means for regulating the supply of air rich in oxygen in accordance with the oxygen content of the air in said building, and means for regulating the temperature of the air being supplied.

EDMUND P. GAINES.